United States Patent [19]
French, Jr.

[11] Patent Number: 6,161,507
[45] Date of Patent: Dec. 19, 2000

[54] TUBE PROTECTION DEVICES AND METHODS

[75] Inventor: Norman L. French, Jr., Pflugerville, Tex.

[73] Assignee: Cypress Semiconductor Corp., San Jose, Calif.

[21] Appl. No.: 09/370,411

[22] Filed: Aug. 9, 1999

Related U.S. Application Data

[60] Provisional application No. 60/098,423, Aug. 31, 1998.

[51] Int. Cl.$^7$ ...................................................... F22B 37/06
[52] U.S. Cl. ............................................. 122/511; 138/91
[58] Field of Search ................................... 122/511, 494, 122/DIG. 13; 220/702; 138/91, 96 R

[56] References Cited

U.S. PATENT DOCUMENTS

| | | | |
|---|---|---|---|
| 406,359 | 7/1889 | Lindrum | 122/511 |
| 685,561 | 10/1901 | Bettermann | 138/91 |
| 1,205,891 | 11/1916 | Harrison | 138/91 |
| 3,747,572 | 7/1973 | Johnson | 122/511 |
| 4,226,380 | 10/1980 | Gay | 242/55 |
| 4,278,422 | 7/1981 | Thompson | 432/253 |
| 5,016,674 | 5/1991 | Kiss | 138/91 |

Primary Examiner—Denise L. Ferensic
Assistant Examiner—Gregory A. Wilson
Attorney, Agent, or Firm—Christopher P. Maiorana, P.C.

[57] ABSTRACT

A tube protector device includes a first cap member, the first cap member being configured to fit over and substantially seal a first end of a tube; a second cap member, the second cap member being configured to fit over and substantially seal a second end of the tube; and a fastening device adapted to resiliently bias the first cap member toward the second cap member. At least the first cap member includes a collar configured to surround a portion of an outer surface of the tube and an angled tube support member configured to fit within the internal diameter of the tube, the collar and the angled support being configured to receive the first end of the tube therebetween. The first cap member further includes a sealing member, a particle barrier and/or a shock absorber between the collar and the angled support member. The tube protector may be used to protect, for example, quartz vacuum tubes from being contaminated by particulate matter, as well as from scratches and chips that may form in its surface during insertion and withdrawal from e.g., semiconductor manufacturing equipment, such as diffusion furnaces.

13 Claims, 2 Drawing Sheets

TUBE PROTECTION DEVICES AND METHODS

CROSS REFERENCE TO RELATED APPLICATION

This application claims priority from U.S. Provisional Patent Application No. 60/098,423 filed on Aug. 31, 1998, and entitled "Tube Protection Devices And Methods".

BACKGROUND OF THE INVENTION

1. Field of the Invention

This invention relates to tube protection devices and methods. More particularly, the present invention relates to devices and methods to protect vacuum tubes, such as diffusion furnace tubes used in semiconductor manufacturing equipment, during their installation in and removal from diffusion furnaces, and the like.

2. Description of the Related Art

Conventionally, diffusion furnace vacuum tubes are installed by sliding the unprotected tube through a particulate laden vestibule block and onto and through the heating elements of the furnace, and then though another vestibule block. However, as the tube is slid through the vestibule blocks of the furnace, the edge of the tube tends to shave particles off the blocks, which particles collect within and around the vacuum tube. As the vacuum tube must be maintained in as pristine a state as possible during installation, the particles shaved from the vestibule blocks necessarily degrade the performance of the tube.

However, the vestibule blocks are not the only source of undesirable particulate matter within and around the tubes. Indeed, the heating elements of the diffusion furnace are also a contaminant source. The heating element coils of the diffusion furnace are separated by insulators. Once the tube has been inserted through the first vestibule block, it must slide past the heating element coils. As the tube is slid through the heating element coils of the furnace, its sealing surface is pushed, shoved, dragged and scrapped across the insulators of the heating elements. This pushing, shoving, dragging and scrapping across the insulators of the heating elements scratches and may actually chip the vacuum tube. Such scratches and chips may and often do cause undesirable vacuum leaks.

Therefore, the tube accumulates particles and other contaminants as it passes through the first vestibule block, may acquire scrapes or chips as it is dragged past the heating coil insulators, and accumulates additional contaminants and particulate matter as it is slid past the second vestibule block. Such scratches, chips and particle contamination degrade the performance of the tube, and cause vacuum leaks. When such contamination or damage to the tube occurs, the tube must be removed, cleaned and repaired, if possible. Such damage may lead to failed product runs, costly down time and the immobilization of a furnace or production line until a replacement tube can be found and installed without excessive damage thereto.

When the tube is removed from the diffusion furnace, the above-described steps are performed in reverse order. However, since the tube is now pulled back through the second vestibule block, the tube occasionally slips out too quickly and drops onto the heating element. As the vestibule's internal diameter is smaller than the internal diameter of the heating elements, they are now on the same plane. Such a drop may, and frequently does, result in a broken tube. Such broken tubes must thereafter be replaced, again immobilizing the furnace, and possibly the entire line until a replacement tube can be located and installed. Moreover, such tubes are costly to replace, both in terms of the value of the tube itself as well as in terms of unproductive down time.

There has been a long felt need, therefore, for devices and methods of protecting such tubes during insertion into and withdrawal from furnaces. In particular, what is needed is a device and a method to prevent particulate matter from contaminating interior and exterior surfaces of such tubes during installation. What is also needed is a device and a method to prevent such tubes from becoming scratched and chipped as they are inserted through and removed from the furnace, past the heating and other internal elements of the furnace.

SUMMARY OF THE INVENTION

It is, therefore, an object of the present invention to provide devices and methods of protecting such tubes during insertion into and withdrawal from furnaces. In particular, it is an object of the present invention to provide devices and methods of preventing particulate and other foreign matter from contaminating interior and exterior surfaces of such tubes during installation and removal thereof. It is a further object of the present invention to provide devices and methods to prevent such tubes from becoming scratched and chipped as they are inserted through the furnace, past the heating and other internal elements of the furnace.

In accordance with the above-described objects and those that will be mentioned and will become apparent below, a tube protector device, according to an embodiment of the present invention, comprises:

a first cap member, the first cap member being configured to fit over and substantially seal a first end of a tube;

a second cap member, the second cap member being configured to fit over and substantially seal a second end of the tube; and a fastening device adapted to resiliently bias the first cap member toward the second cap member.

According to other illustrative embodiments, the first cap member may include a collar configured to surround a portion of an outer surface of the tube and an angled tube support member configured to fit within an internal diameter of the tube, the collar and the angled support being configured to receive the first end of the tube therebetween. The first cap member may further comprise a sealing member, a particle barrier and/or a shock absorber between the collar and the angled support member. The sealing member may include one or more O-rings.

Similarly, the second cap member may include a collar configured to surround a portion of an outer surface of the tube and an angled tube support member configured to fit within an internal diameter of the tube, the collar and the angled support being configured to receive the second end of the tube therebetween. The second cap member may further comprise a sealing member, a particle barrier and/or a shock absorber between the collar and the angled support member. The sealing member may include one or more O-rings.

According to still further embodiments, the second cap member may comprise a substantially flat plate. The substantially flat plate may include a sealing member, a particle barrier and/or a shock absorber mounted thereon. The flat plate may include one or more O-rings mounted thereon.

One or both of the first and second caps may include a centrally disposed hook to which the fastening device is attachable. The fastening device, for example, may include a rubber band or other resilient device. The fastening device, in use, may be stretched within the interior of the tube.

The present invention may also be viewed as a method of protecting a tube, comprising the steps of:

placing a first protective cap over a first end of the tube;

attaching a resilient fastening device to the first protective cap;

stretching the fastening device and attaching the fastening device to a second protective cap configured to fit over a second end of the tube; and releasing tension on the fastening device and covering the second end of the tube with the second protective cap.

According to other preferred embodiments, one or both of the first and second protective caps may include an O-ring mounted therein and the method further may comprise the step of selecting the size of the O-ring according to the size of the tube. The stretching step may include a step of inserting a hook rod into the tube to catch the fastening device and retracting the rod to stretch the fastening device.

BRIEF DESCRIPTION OF THE DRAWINGS

For a further understanding of the objects and advantages of the present invention reference should be made to the following detailed description, taken in conjunction with the accompanying figures, in which.

DESCRIPTION OF THE PREFERRED EMBODIMENTS

Figure 1:
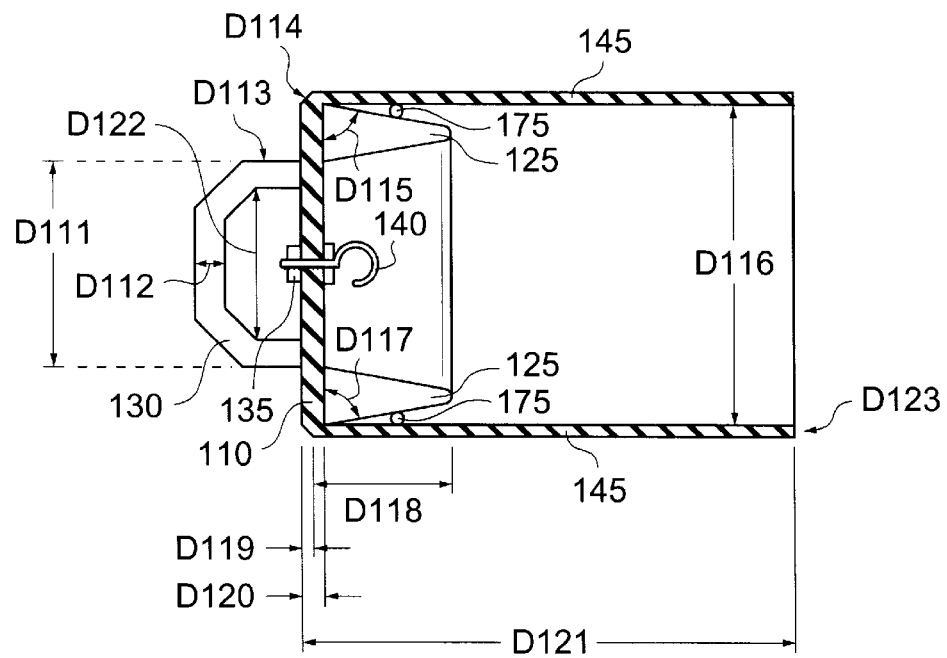
FIG. 1 shows a cross sectional side view of an embodiment of a cap member of the tube protector device according to the present invention.

The structure of the present tube protector device and method will be described with reference to FIGS. 1 through 7. The tube protector device according to the present invention includes a first cap member 110. The first cap member 110 is configured to fit over and substantially seal a first end of a tube, such as, for example, a quartz vacuum tube 170 of a diffusion furnace for a semiconductor manufacturing operation. A second cap member 120 (shown in FIG. 6) is disposed on the second end of the tube 170. A fastening device 150 (FIGS. 4 and 6) is attached to both the first and the second cap members 110, 120 and resiliently biases the first cap member 110 toward the second cap member 120. When the first and second caps 110, 120 are in place on the first and second ends, respectively, of the tube 170, the tube 170 may be inserted through the furnace vestibule and slid past the heating elements of the furnace and through the second vestibule without gathering particulate matter or other contaminants inside the tube 170 and without being scratched or chipped.

The first cap member 110 may include a collar 145 configured to surround a portion of an outer surface of the tube 170. As shown in FIG. 1, the first cap 110 may also include an angled tube support 125 configured to fit within the inner diameter of the tube 170, the collar 145 and the angled support 125 being configured to receive the first end of the tube 170 therebetween. The angled tube support 125 may form, for example, an angle of about 75 degrees with respect to the surface of the first cap member 110 that is perpendicular to the longitudinal axis of cap member. Also as shown in FIG. 1, the first cap member 110 may include a sealing member, a particle barrier and/or a shock absorber 175 between the collar 145 and the angled tube support 125. This sealing member, particle barrier and/or shock absorber 175 may be, as shown in FIG. 1, an O-ring sized to the tube 170 to be protected.

Figure 3:
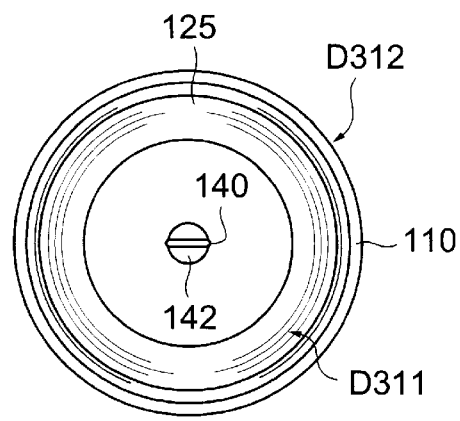
FIG. 3 shows a back view of an embodiment of the cap member of the tube protector device according to the present invention.
Figure 4:
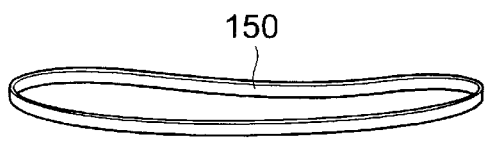
FIG. 4 shows an embodiment of a resilient fastening device used in installing and removing the tube protector device according to the present invention.

The second cap member 120 may be similar to the first cap member 110, or may have a structure that differs from that of the first cap member 110. For example, if the tube 170 includes a smaller end, as shown in FIG. 6, the second cap member 120 may include a substantially flat plate 120 (shown in FIG. 5) configured to fit over the smaller end of the tube 170. The substantially flat plate 120 may also include a sealing member, a particle barrier and/or a shock absorber similar to that referenced by numeral 175 mounted thereon. Such a sealing member, a particle barrier and/or a shock absorber may include an O-ring. The first and second caps 110, 120 each may include a centrally disposed hook 140 to which the fastening device 150 may be attached. The hook 140 may be a hooked bolt and may be attached to the first and second cap members 110, 120 along with a washer and nut assembly 135, 142, as shown in FIGS. 1, and 3. A handle 130 facilitates placement and removal of the first cap member 110 onto the first end of the tube 170. The fastening device 150 may include a rubber band, as shown in FIG. 4.

The present invention prevents expensive tubes, such as quartz tubes used in conjunction with semiconductor diffusion chambers, from being scratched to the point of failure, chipped beyond use and needlessly contaminated by particulate matter. The device according to the present invention provides caps to seal over the sealing surface and large open end of such tubes as they are installed into and removed from diffusion furnaces and/or other devices and machines. Thanks to the present invention, the sealing surface of such tubes is protected from scratches, chips and breakage and prevents the clean tube from being soiled prior to its insertion into the heating system or other machine. The device may be installed in a few minutes (e.g., about 3) and has the potential of saving a great deal of money, maintenance efforts and down time. The tube protector device, moreover, may be constructed in various sizes to enable its use with most any tube used for most any purpose. For example, the tube protector device according to the present invention may also be advantageously used to protect the tube 170 during shipping thereof.

To use the tube protector according to the present invention, the hook rod 155 is equipped with a sufficient number of extension rod units 160, and passed through, e.g., the second or small end of the tube 170. An O-ring 175 of a suitable size for the tube 170 being used may then be placed inside the first cap member 110, as shown in FIG. 1. The O-ring 175 acts as a particle barrier, a sealing member and a shock absorber between the collar 145 of the first cap member 110 and the angled tube support 125. Next, one end of the fastening device 150, which may be, for example, a thick rubber band, is attached to the hook 140. The other end of the fastening device 150 is then hooked onto the hook rod 155. The loose excess portion of the fastening device 150 is then placed inside the tube 170. The first cap member 110 is then gently placed over the first end of the tube 170. The hook rod 155 (with all necessary extension rods 160) and the fastening device 150 are then pulled through the second (e.g., small) end of the tube 170. Once the rod 155, 160 has cleared the second end of the tube 170, the fastening device 150 is removed from the hook rod 155, 160 and the second cap member 120 (e.g. substantially flat plate) is attached to the fastening device 150. Releasing the tension on the fastening device 150, the second cap member 120 is gently disposed over and on the second (e.g., small) end of the tube 170. The tube protector device is now installed on the tube 170.

To install the tube and protector device assembly into the manufacturing equipment (e.g., a diffusion furnace, not shown), the first and second ends of the tube 170 are cleaned, to remove any contaminants that may have accumulated thereon during the above-described installation procedure. The tube 170 and protector device assembly is then inserted into the furnace and the second cap member 120 is removed from the second end of the tube 170. The hook rod 155, 160 is then re-attached to the fastening device 150 and extended into the tube 170, up to the first cap member 110. The first cap member 110 is then removed from the tube 170 and the fastening member 150 removed from the hook rod 155, 160. The hook rod 155,160 is then removed from within the tube 170. In this manner, a clean, scratch and chip free tube 170 has been installed into the furnace. When removing the tube 170 from the furnace, the above-detailed steps may be carried out in reverse order to remove the tube without damage or contamination.

The tube protector device according to the present invention may be made of any hard and rigid material, such as steel, plastics, carbon fiber composites, etc.

While those of skill in this art will readily recognize that the tube protection device disclosed herewith may be scaled to various dimensions, the following illustrative approximate dimensions of the constituent components of the inventive device are given. However, it is to be understood that the following approximate preferred, lower and upper dimensions are given only for illustrative purposes and to disclose the relative dimensions of the constituent elements. The present invention, therefore, should in no way be considered to be limited to the dimensions given herewith.

TABLE 1

Dimensions for FIG. 1

| Dimension reference | Preferred | Lower | Upper |
|---|---|---|---|
| D111 | 6" | 2.5" | 15" |
| D112 | 1" | 0.25" | 1.5" |
| D113 | 1½" | 0.375 | 2" |
| D114 | 20 angle | 0 angle | 60 angle |
| D115/117 | 75 angle | 15 angle | 85 angle |
| D116 | 9.3" | 4.2" | 20" |
| D118 | 4" | 1" | 10" |
| D119 | ½" | 0.125" | 2" |
| D120 | ¾" | 1/16" | 1" |
| D121 | 15" | 3.5" | 60" |
| D122 | 4" | 1" | 16" |
| D123 | 1/8" | 1/32" | ½" |

TABLE 2

Figure 2:
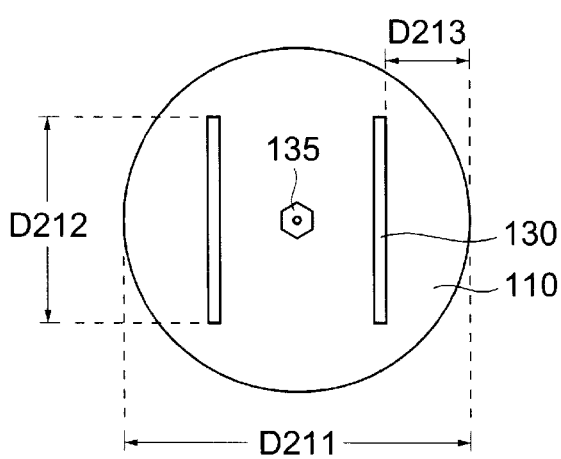
FIG. 2 shows a front view of an embodiment of the cap member of the tube protector device according to the present invention.

Dimensions for FIG. 2

| Dimension reference | Preferred | Lower | Upper |
|---|---|---|---|
| D211 | 9.55" | 2.5" | 30" |
| D212 | 6" | 1.5" | 24" |
| D213 | 3" | 0.75" | 12" |
| D214 | ¼" | 1/16" | 1" |

TABLE 3

Dimensions for FIG. 3

| Dimension reference | Preferred | Lower | Upper |
|---|---|---|---|
| D311 | 75 | 15 | 85 |
| D312 | 1/8" | 1/32" | ½" |

TABLE 4

Figure 5:
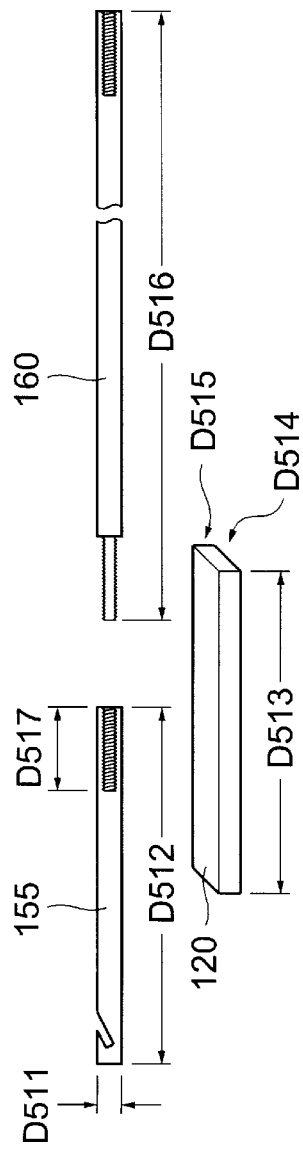
FIG. 5 shows an embodiment of a hook rod used in installing and removing the tube protector device according to the present invention.
Figure 6:
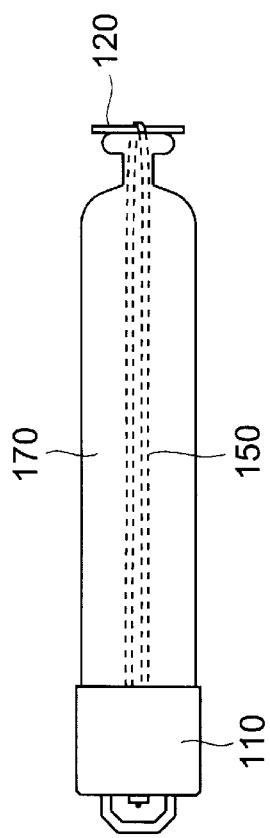
FIG. 6 shows an embodiment of the tube protector device installed on a vacuum tube.
Figure 7:
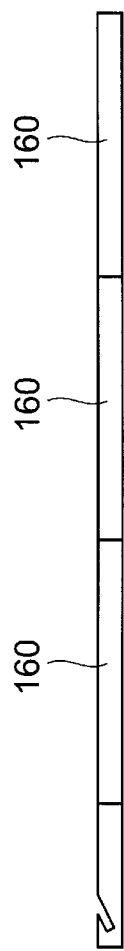
FIG. 7 shows an embodiment of the hook rod of FIG. 5 with a plurality of extension rod units installed thereon.

Dimensions for FIG. 5

| Dimension reference | Preferred | Lower | Upper |
|---|---|---|---|
| D511 | 3/8" | 3/32" | 1.5" |
| D512 | 6" | 1.5" | 24" |
| D513 | 5" | 1.25 | 20" |
| D514 | 1" | ¼" | 4" |
| D515 | ½" | 1/8" | 2" |
| D516 | 3 ft. | 9" | 12 ft. |

While the foregoing detailed description has described preferred embodiments of the present invention, it is to be understood that the above description is illustrative only and not limiting of the disclosed invention. For example, the dimensions given may vary from the illustrative examples given. Details in the structure of the protector device may be varied without, however, departing from the present invention as defined by the claims. The tube protector may be made of materials other than those specifically disclosed without, however, departing from the scope and spirit of the present invention. Thus, the present invention to be limited only by the claims as set forth below.

What is claimed is:

1. A tube protector device, comprising:
    a first cap member, the first cap member being configured to fit over and substantially seal a first end of a tube, the first cap member including a collar configured to surround a portion of an outer surface of the tube and an angled tube support member configured to fit within an internal diameter of the tube, the collar and the angled support being configured to receive the first end of the tube therebetween;
    a second cap member, the second cap member being configured to fit over and substantially seal a second end of the tube; and
    a fastening device adapted to resiliently bias the first cap member toward the second cap member.

2. The tube protector device of claim 1, wherein the first cap member further comprises at least one of a sealing member, a particle barrier and a shock absorber between the collar and the angled support member.

3. The tube protector device of claim 2, wherein the sealing member includes at least one O-ring.

4. The tube protector device of claim 1, wherein the second cap member includes a collar configured to surround a portion of an outer surface of the tube and an angled tube support member configured to fit within an internal diameter of the tube, the collar and the angled support being configured to receive the second end of the tube therebetween.

5. The tube protector device of claim 4, wherein the second cap member further comprises at least one of a sealing member, a particle barrier and a shock absorber between the collar and the angled support member.

6. The tube protector device of claim 5, wherein the sealing member includes at least one O-ring.

7. The tube protector device of claim 1, wherein the second cap member comprises a substantially flat plate.

8. The tube protector of claim 1, wherein at least one of the first and second caps includes a centrally disposed hook to which the fastening device is attachable.

9. The tube protector of claim 1, wherein the fastening device includes a rubber band.

10. The tube protector device of claim 1, wherein the fastening device, in use, is disposed within an interior of the tube.

11. Method of protecting a tube, comprising the steps of:

placing a first protective cap over a first end of the tube;

attaching a resilient fastening device to the first protective cap;

stretching the fastening device and attaching the fastening device to a second protective cap configured to fit over a second end of the tube, at least one of the first and second protective caps including an O-ring mounted therein, a size of the O-ring being selected according to a size of the tube; and releasing tension on the fastening device and covering the second end of the tube with the second protective cap.

12. Method of protecting a tube, comprising the steps of:

placing a first protective cap over a first end of the tube;

attaching a resilient fastening device to the first protective cap;

inserting a hook rod into the tube to catch the fastening device;

stretching the fastening device by retracting the rod and attaching the fastening device to a second protective cap configured to fit over a second end of the tube by; and releasing tension on the fastening device and covering the second end of the tube with the second protective cap.

13. The method of claim 11, wherein the stretching step includes a step of inserting a hook rod into the tube to catch the fastening device and retracting the rod to stretch the fastening device.

* * * * *